Figures 1, 2:
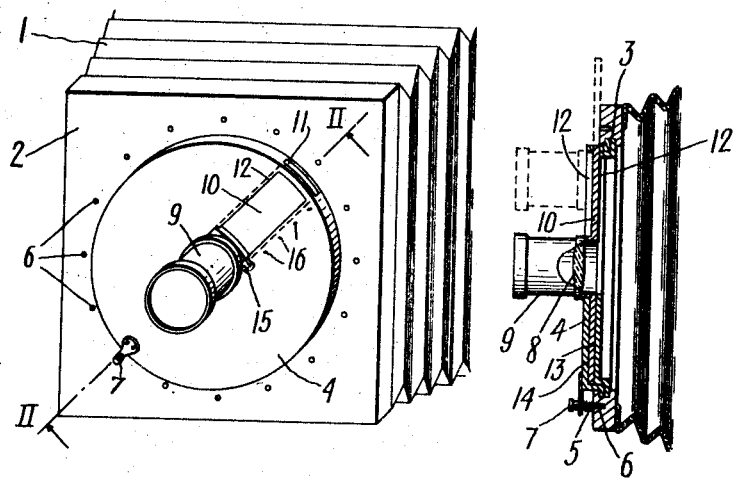

C. P. BROWNING.
PHOTOGRAPHIC CAMERA.
APPLICATION FILED JUNE 16, 1915.

1,282,373.

Patented Oct. 22, 1918.

INVENTOR.
Clarence P. Browning,
BY
ATTORNEY

UNITED STATES PATENT OFFICE.

CLARENCE P. BROWNING, OF BROOKLYN, NEW YORK.

PHOTOGRAPHIC CAMERA.

1,282,373.　　　　　Specification of Letters Patent.　　Patented Oct. 22, 1918.

Application filed June 16, 1915. Serial No. 34,343.

*To all whom it may concern:*

Be it known that I, CLARENCE P. BROWNING, a citizen of the United States, residing in the borough of Brooklyn, city and State of New York, have invented certain new and useful Improvements in Photographic Cameras, of which the following is a specification.

My invention relates to photographic cameras which are designed to take a plurality of exposures on a single photographic plate, so that, although the individual exposures may vary in area, or even be irregular in outline, substantially the entire area of the plate will be covered by them. This device is particularly useful in connection with photoengraving, where it may be desired to cover the surface of a sensitized plate with a number of exposures of rectangular or irregular outline, so that the total area of the plate may be covered as nearly as is practicable. Such an operation is particularly desirable in the practice of certain improvements in photoengraving which form the subject of my co-pending application filed June 8, 1915, Serial No. 32858. In the method described in that application I provide a support in the nature of a metal plate which bears a coating of bichromate, upon which is a coating of transparent rubber, on which in turn is superimposed a coating of silver emulsion. In that application I have set forth how with such a plate it is possible to expose the plate as usual in the first exposure on photo-engraving, making a negative from the silver coating, intensifying and hardening this negative, then printing through it directly on to the bichromate solution which is beneath it, after which the silver and rubber may be removed and the bichromate developed and the plate etched in the usual manner. It will be observed that this process does away with the necessity for making a silver negative, stripping the negative from its glass support, reversing it and then printing upon the metallic plate which has been sensitized with a bichromate solution. In other words, it does away with the necessity for any glass plate whatever, and also eliminates the step of stripping and reversing the silver negative.

However, in the use of such a plate, it is desirable to cover the entire area of the plate as nearly as may be with negatives; otherwise there will be a waste of metal when it comes to etching the plate, since there will be large blank portions upon the metallic plate.

In the accompanying drawings, which form a part of this specification, Figure 1 is a perspective view of a portion of the bellows and front and lens board of a camera embodying certain features of my invention, and Fig. 2 is a transverse sectional view on line II—II of Fig. 1.

Referring to the drawings in detail, the numeral 1 designates the bellows of a camera, to which is attached a front board 2, which is rabbeted at 3 to receive a circular revolving lens board 4. This lens board is free to revolve in its rabbeted seat and may be locked in any one of a plurality of positions by means of a spring-pressed plug, or catch, 5 which is adapted to enter any one of a plurality of holes 6 in the front board of the camera. A handle 7 is provided by which the catch may be removed from the hole in which it is seated, and by means of which the lens board may be rotated. The lens 8 is mounted in the customary lens tube 9, which in turn is mounted upon a slide 10 which is free to move in a slot 11 arranged radially of the lens board. The lens board has a radial slot 12 in line with but somewhat narrower than the central slot in which the shutter or slide 10 is seated. In line with the slide 10, and extending on the opposite side of the lens 2 is a similar slide 13 which is adapted to slide into a space 14 in the interior of the lens board. It will be seen that this construction permits the lens to be moved radially with respect to the lens board, as, for instance, to the position indicated by the dotted lines in Fig. 2, and when so moved it may be locked in adjusted position by means of a spring catch 15, coöperating with a plurality of holes 16. The construction of this catch may be similar to that of the catch 5. It will be seen that no matter in what position the lens is placed, such as that indicated by the dotted lines in Fig. 2, no light can pass through the front board or lens board of the camera, except that admitted through the lens, since the slide composed of the parts 10 and 13 coöperate to make the lens board light-tight except at the point where the lens is. This construction provides for a universal adjustment of the lens over the entire area covered by the lens board, since the two adjustments, namely, the radial adjustment of the lens tube with reference to the lens board and the rotation of the lens board with respect to the front board of the camera, enable the lens to be placed at any desired point within the periphery of the lens board. This makes it possible to center the focus of an image over substantially any portion of area of the sensitive plate placed in the camera.

It is of course to be understood that any type of focal plane shield may be employed in this camera.

While I have illustrated and described only certain specific embodiments of my invention, I realize that it is susceptible of broad application, and I do not desire to be limited to the precise structure shown and described, except as defined by the following claim, nor to its use with the particular process set forth in the companion application referred to, although I regard it as especially useful in that connection.

Having thus described my invention, I claim:

In a photographic camera, a front board, a circular lens board capable of being rotated, having coöperative locking means, said lens board being provided with a slide extending completely across a diameter of said circular lens board, a lens centrally located on said slide whereby in one position the lens may be centrally located in regard to the lens board, coöperative locking means carried by the front board and lens board, said slide terminating adjacent the outer edges of the circular lens board whereby when the lens is centrally located there are no projecting portions of the slide.

CLARENCE P. BROWNING.

Copies of this patent may be obtained for five cents each, by addressing the "Commissioner of Patents, Washington, D. C."